Dec. 30, 1958 K. K. SCHAKEL 2,866,315
VARIABLE EXHAUST NOZZLE ACTUATOR
Filed April 14, 1955
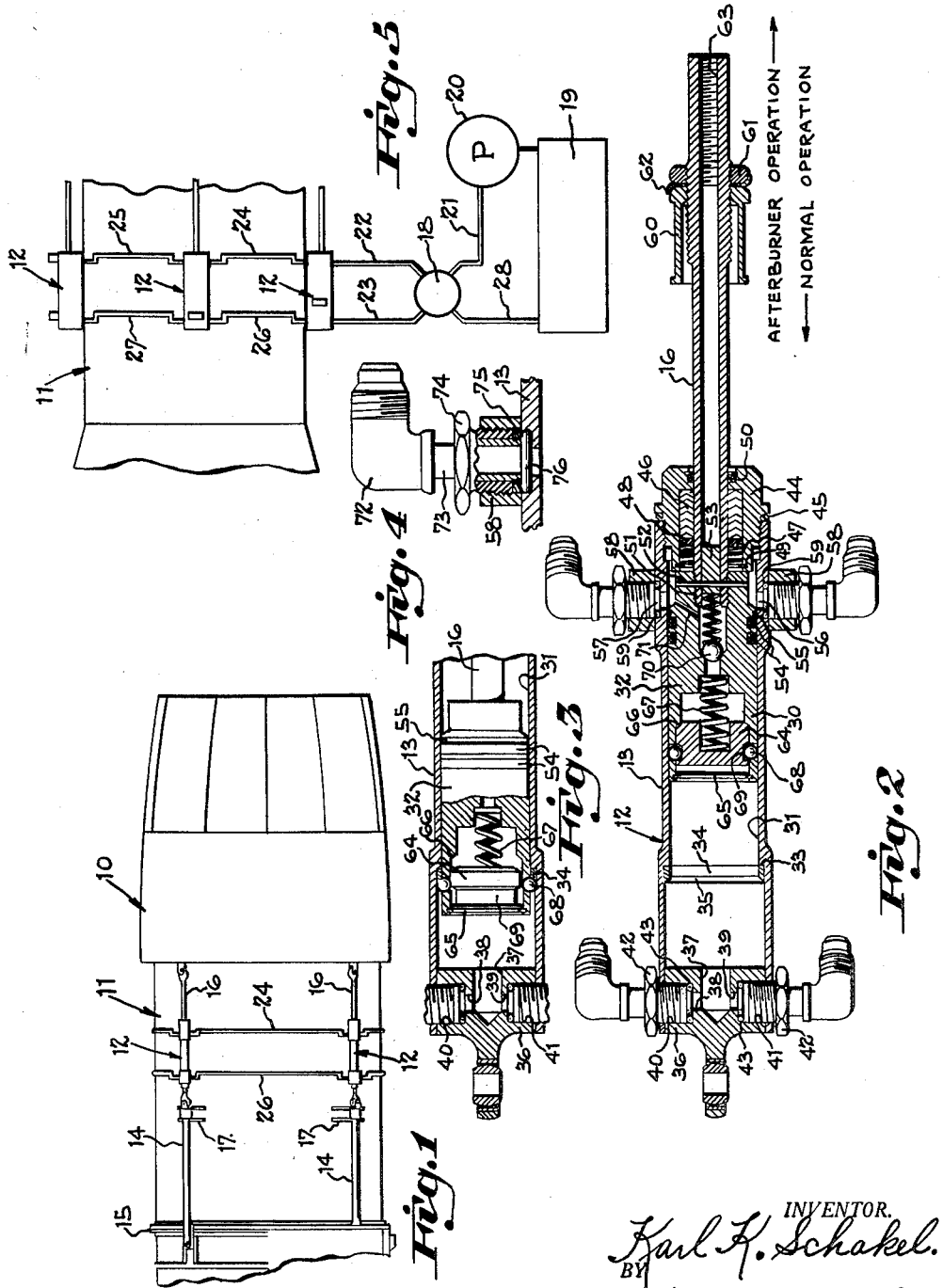
INVENTOR.
Karl K. Schakel.
BY Wood, Herron & Evans,
ATTORNEYS.

United States Patent Office 2,866,315
Patented Dec. 30, 1958

2,866,315

VARIABLE EXHAUST NOZZLE ACTUATOR

Karl K. Schakel, Cincinnati, Ohio, assignor to Kett Corporation, Cincinnati, Ohio, a corporation of Ohio Application April 14, 1955, Serial No. 501,301

1 Claim. (Cl. 60—35.6)

This invention relates to means for actuating a variable exhaust nozzle of the type utilized for gas turbine engines of military aircraft which are equipped with afterburners.

The exhaust nozzle used for aircraft gas turbine engines provides a constriction, through which the flow of effluent gases pass, which is designed to increase the velocity of the gases and hence increase the thrust produced by the engine. Essentially, an afterburner is a chamber adjacent to the exhaust nozzle into which raw fuel is injected. The raw fuel, in coming into contact with the hot exhaust gases, burns with explosive force resulting in a substantial increase in the thrust compared to that developed by the engine in normal operation. Under the circumstances, unless the area of the opening in the exhaust nozzle is increased over that required for normal operating conditions, a back pressure is developed which adversely affects the operation of the engine.

Variable exhaust nozzles which are adapted to open up for afterburner operation are well known, and are being used in military aircraft. The present invention is not concerned with the construction of such a nozzle, but is concerned primarily with an improved actuator for such a nozzle, which actuator is hydraulically operated and which is adapted to operate efficiently over a wide temperature range, including temperatures heretofore considered to be too high for a hydraulic system to function effectively. Thus, this invention makes it possible to utilize the efficiency and positive, trouble free action which is inherent in a hydraulic system in an environment heretofore considered to be too severe for such a system.

Under normal operating conditions, a variable exhaust nozzle is constricted by vanes or other adjustable elements which are held in angulated positions such that the area of the exhaust opening is reduced. The reduced area of the exhaust opening may be varied within a comparatively limited range while under normal operating conditions, and this is highly desirable in order to obtain the highest operating efficiency from the engine. But, the variation within the range is small compared to the "wide open" condition of the nozzle under afterburner operation. The hydraulically operated actuator of this invention provides the force which is required for effecting the comparatively slight variations in the size of the exhaust nozzle opening for normal operational purposes. In addition, it provides the force required to open and close the vanes and to hold them in the extended position required for afterburner operation, the movement of the vanes to and from the extended position under these circumstances being substantially great compared to the small variations required from time to time in the normal operating range.

Equally important, however, means are provided to lock the present actuator in normal operating position in the event a leak develops in the hydraulic system. This feature is of great moment in military aircraft because of the possibility of the hydraulic system being damaged by anti-aircraft fire. The relatively opened exhaust nozzle condition of afterburner operation is not efficient for normal operation—and the pressure of the effluent gases on the nozzle vanes tends to open them. Thus, if pressure were lost in the hydraulic system, the force of the effluent gases would open the nozzle. To insure that this cannot happen, and to maintain efficient operating conditions should the hydraulic system become disabled for any reason, means are provided to automatically lock the vanes in the constricted, normal operating condition, which means become effective automatically the instant pressure is lost in the hydraulic system and which means are automatically decommissioned upon the restoration of pressure to the system.

Specific objectives and other features of the present invention will be readily apparent to those skilled in the art from the following detailed description of the drawings in which:

Figure 1 is a diagrammatic side view of the exhaust end of an aircraft gas turbine engine showing actuators made in accordance with the present invention operatively connected to the exhaust nozzle of the engine.

Figure 2 is a cross sectional view taken longitudinally through one of the actuators in extended, afterburner position.

Figure 3 is a fragmentary cross sectional view showing the front portion only of the actuator in locked, normal operating position.

Figure 4 is an enlarged fragmentary cross sectional view showing the preferred means for attaching the lines of the hydraulic system to the actuators.

Figure 5 is a schematic layout view showing the hydraulic system which serves the actuators.

In the drawings the numeral 10 designates an afterburner exhaust nozzle assembly of the type employing a plurality of vanes which may be shifted from one position in which they constrict the area of the exhaust opening to a second position in which the area is increased in size for afterburner purposes. The exhaust nozzle assembly is shown attached to the rear of a gas turbine engine housing 11. The numeral 12 generally indicates a hydraulically operated afterburner actuator assembly made in accordance with the principles of the present invention. Three, four or more actuators, if desired, may be employed, being mounted upon the housing of the gas turbine engine at equally spaced points around its periphery.

In general, each actuator consists of a cylinder or barrel 13, a tie rod 14 by means of which it may be attached to structural members 15 of the engine housing, and an actuator rod assembly 16 by means of which it may be attached to the exhaust nozzle assembly 10. Each tie rod may be additionally supported on the engine housing by stabilizer brackets 17 which are welded or otherwise attached to the housing and which journal the rear ends of the tie rods. The rods, it will be noted, are attached to the actuators by means of conventional rod end bearings. The exhaust nozzle, which may be of known construction, is arranged so that rearward movement of the actuator rods causes vanes of the exhaust nozzle to open, thus increasing the area of the exhaust nozzle opening for afterburner operation. Forward movement of the actuator rods moves the vanes to constrict the size of the opening for normal operation of the engine.

Referring now to the schematic drawing of Figure 5, each actuator encloses a double acting piston, and the actuators are connected in parallel in the hydraulic system so that they may be controlled by a single four-way valve such as the one indicated at 18. The hydraulic system includes a reservoir 19, a pump 20, the pump supplying hydraulic fluid under pressure to the four-way valve through a conduit 21. The four-way valve is arranged so that hydraulic fluid under pressure may be directed selectively to one of two lines 22 or 23. The line 22 is connected to a rear end of the first actuator whereas the line 23 is connected to the forward end of the first actuator. Additional lines such as those shown at 24 and 25 connect the rear end of the first actuator to the rear end of the second actuator, the rear end of the second to the third etc., so that when hydraulic fluid under pressure is directed into line 22, the actuators operate simultaneously to pull all of the actuator rods 16 simultaneously forward for normal engine operation. At the same time conduits, such as those indicated at 26 and 27, which connect the forward ends of the actuators permit the hydraulic fluid to be exhausted to line 23 and thence through the four-way valve 18 to a conduit 28 which returns the hydraulic fluid to reservoir 19. Any means such as mechanical linkage or an electrical system may be employed to connect the four-way valve to a control in the cockpit of the aircraft. In addition, the hydraulic system through the valve 18 may be interconnected with throttle controls for the gas turbine engine so that the exhaust nozzle will automatically compensate for demands placed upon the engine.

The actuator cylinder 13 comprises a tube 30 having a finished bore 31 therein to accommodate a piston head assembly 32. At the forward end of tube 30 the internal bore 31 is increased in size to provide a right angular, annular shoulder 33. This shoulder provides a seat for a ring of Stellite which has its forward edge bevelled as at 35 to provide a cam surface, the purpose of which will be explained later. The forward end of the cylinder is closed by means of a plug 36 which is inserted into the internal bore of the cylinder and brazed, welded or otherwise fastened securely and sealed to the cylinder. The outer end of the plug carries part of the rod end bearing by means of which the actuator assembly is attached to the tie rod 14. The inner face of the plug has an axial bore 37 therein which is open to radial passageways 38 and 39 which branch from bore 37 at opposite sides. Each one of the passageways 38 and 39 opens into an enlarged, threaded bore, designated 40 and 41 respectively, each of which receives an elbow coupling 42. The area surrounding each of the bores 38 and 39 inside of the enlarged threaded bores 40 and 41 is counterbored to provide a seat for a metal O ring 43, metal O rings being used because of the high temperature of the environment in which the actuator must operate. The rear end of the cylinder is also closed, in this instance, by means of a plug 44 which threads into the cylinder and which is sealed by a metal O ring 45 engaged between a rim flange on the plug and the rim of the cylinder. The actuator rod 16, which is the piston rod, passes through the threaded plug 44 and to seal this end of the cylinder a packing gland 46 is provided at the inside of the threaded plug 44 surrounding the actuator rod. Preferably, the packing gland is spring loaded by means of a coil spring 47 which surrounds the rod and which is under tension between a follower ring 48 of the packing gland and a retainer ring 49. In addition, a wiper 50 may be installed in the head of the threaded plug 44 to prevent foreign particles from getting into the packing gland. The actuator rod is hollow for lightness and its outer surface is polished so that a tight fit may be obtained between it and the packing gland.

The forward end of the actuator rod is threaded and is screwed into a threaded internal bore in the rear end of the piston head as at 51. To lock the rod in place, a cross pin 52 is provided which extends from one side of the piston head to the other through the rod. In addition, a cylindrical plug 53 is brazed to the inside of the forward end of the hollow actuator rod to seal the opening through the rod. In the instance shown, three piston rings are provided to seal the piston. Two of these, indicated at 54, may be made of carbon filled Teflon having an expanded ring (not shown). The third piston ring may be a high temperature ring indicated at 55 which may be made of cast iron.

The area inside of the cylindrical bore 31 to the rear of the piston head assembly is open to two additional couplings 42—42 which are disposed at the opposite sides of the cylinder, through bores 56 and 57 respectively. In this instance, each coupling threads into a bushing 58 which is brazed or welded to the outside of the cylinder. Each one of the two bores 56 and 57 is counterbored at the outside thereof to provide a seat for a metal O ring 59. It will be seen, therefore, that admission of hydraulic fluid under pressure to the rear of the piston will cause the piston head to move to the left as seen in Figure 2, pulling the actuator rod forwardly with respect to the engine which is the movement for changing the exhaust nozzle to normal operating condition.

The limit of rearward movement of the piston head is determined by the abutment of the piston head against the inner end of the threaded plug 44. This is shown in Figure 2. The limit of the forward travel of the piston head is determined by an adjustable stop 60 which is threaded onto the actuator rod and which is adapted to abut the outer end of threaded plug 44. A jam nut 61 and a tab lock washer 62 are provided for locking the adjustable stop upon the actuator rod. As shown in Figure 2 means such as the internal thread 63 may be provided for securing the actuator rod to the linkage of the exhaust nozzle, such linkage being of known construction.

The forward end of the piston head is hollow, and it seats a locking piston 64 which is adapted to slide inside of the main piston head between a forward position in which it abuts a split retaining ring 65 and a rearward position in which it abuts an internal shoulder 66. A coil spring 67, seated within the main piston head is provided to bias the locking piston toward the forward position. In this position, a plurality of locking balls 68, which normally reside within a circumferential groove 69 in the locking piston are cammed outwardly through radially disposed apertures in the main piston head, as shown in Figure 3, so as to strike the shoulder 35 on the Stellite ring 34. In this way the balls prevent the piston head assembly from moving toward the right into the position of Figure 2, which is the afterburner position.

The area of the locking piston which is exposed to hydraulic fluid ahead of the piston assembly is such that the force of spring 67 is overcome upon the application of hydraulic pressure to this area which moves the locking piston back into the main piston head, thereby permitting the balls to drop into groove 69 which, in turn, permits the main piston head to move toward the right and into afterburner position. If for any reason the hydraulic fluid pressure drops off from a predetermined level which is the normal operating level (approximately 1500 pounds per square inch) the coil spring 67 becomes effective, thereby holding the locking balls in their extended positions which, of course, prevents the main piston head from moving toward the right.

The internal bore to the right or behind the small locking piston is in communication with the opposite side of the main piston head through a passageway past a spring urged ball check valve 70, and through a radial passageway 71. Thus if hydraulic fluid leaks past the locking piston such fluid will be forced past the ball check valve when the locking piston is moved to the right. The spring which urges the check ball closed is conveniently seated at its rear end inside of the hollow actuator rod on the plug 53. The ball check, being a one-way valve, prevents hydraulic fluid from passing from the back of the main piston to the chamber behind the small locking piston.

The preferred type of elbow connector for attaching the various conduit lines 22—26 to the actuators is shown in Figure 4. The elbow part of the connector, indicated at 72, may be of conventional construction. The arm of the elbow which is connected to the cylinder comprises a hollow, cylinder stem 73 which has a coupler nut 74 slidably mounted upon it. The outer end of stem 73 mounts an annular bushing 75 which may be secured to it by brazing or by silver solder. The exposed face i. e., the bottom as shown in Figure 4, of bushing 75 is machined so as to be flat. It is this face which makes contact with the metal O ring, indicated at 76 in this case. The metal O rings used throughout the actuator are available commercially. They consist of metal tubing such as stainless steel which is formed into a circle and the abutting ends welded to one another. To attach the preferred coupler to the cylinder and to its connecting lines, the O ring is seated and the coupler nut is advanced down into the threaded bore until the lower face of the bushing 75 makes light contact with the O ring. In this condition, the elbow may be rotated. The angulation shown in the various connector lines is provided to compensate for expansion and contraction due to temperature changes. However, such angulation makes it difficult to attach the respective ends of the line to rigidly mounted connector elbows. Hence, the rotative movement afforded by the present connector construction facilitates installation. Once the connector lines are attached to the elbows, the coupler nuts may be given a partial turn so as to tighten them down onto the O rings to seal the junctures of the couplings with the cylinders. The coupler nuts then may be secured by safety wire in the conventional manner so that they cannot become loosened during the operation of the aircraft.

For normal flight conditions, four-way valve 18 is set so that conduit 22 and the various connector lines which join the respective rear ends of the cylinder are under pressure, which forces the respective piston assemblies forwardly within the cylinders, thereby retracting the actuator rods to constrict the exhaust nozzle. At the same time, the forward ends of the cylinders are exhausted and are connected to the reservoir through the conduit 23, the four-way valve 18 and line 28. In order to maintain high efficiency of operation of the engine it is usually required that the area of the exhaust nozzle opening be changed slightly from time to time. The movement of the piston in order to effect such change is limited to that area which is to the left of the Stellite ring 34 as shown in Figure 2. One limit of the travel of the piston under normal operating conditions is provided by the forward end of the cylinder. The other limit of travel under the circumstances is defined by the ring itself, which is the position of the piston shown in Figure 3. The movement of the piston within this range is limited to approximately one inch but this is sufficient for obtaining the slight variations in the opening of the exhaust nozzle required under normal engine operating conditions. In the forward position, or range of travel of the piston under normal operating conditions, the locking balls 68 of each piston assembly can move radially outwardly under the biasing action of spring 67; this will not happen, of course, unless for some reason or another hydraulic pressure in the cylinder ahead of the piston falls off to a point to permit the spring to force outwardly the locking piston 64. The balls are positively cammed radially outwardly as the locking piston comes forward by the angulated shoulder 66 which is in the groove 69 in the locking piston. Hence if for any reason the hydraulic system should go out while the exhaust nozzle is in normal operating condition, the piston head cannot move toward the right as shown in Figure 3, because the balls 68 are locked against the bevelled Stellite ring 34. The piston head will remain in this position until the hydraulic system is repaired and pressure can be directed into the forward end of the cylinder 13.

In normal operation, the constricted vanes of the exhaust nozzle tend to open up due to the pressure of effluent gases; thus there is a constant rearward pull on the actuator rods and with a hydraulic pressure failure, were it not for the locking balls, the respective pistons would be pulled to the right and the exhaust nozzle would open up, which is a highly inefficient operating condition for the engine except during afterburner operation.

To use the afterburner, four-way valve 18 is changed to reverse the directions of flow of pressure fluid through the system so that line 23 is under pressure and line 22 is exhausted to the reservoir. As soon as enough pressure is built up in the forward end of the cylindrical bore, the locking piston 64 is forced back into the inside of the main piston and the locking balls may be cammed back into the groove 69 so that the piston can move toward the right into afterburner operating position. To again restrict the nozzle of the exhaust opening for normal operation the valve is reversed and the piston is forced forward.

Having described my invention, I claim:

A hydraulic actuator for the exhaust nozzle of a gas turbine engine having an afterburner, the opening of the exhaust nozzle being variable within a first range for normal operation in which the area of the opening of the exhaust nozzle is reduced, and said exhaust nozzle movable through a second range to fully open condition for afterburner operation, said actuator comprising an elongated cylinder, a main piston within said cylinder, means for connecting the piston to the exhaust nozzle such that movement of the piston longitudinally of the cylinder varies the size of the opening of the nozzle, the forward portion of said cylinder being larger in diameter than the rear portion thereof to provide an annular shoulder, the distance from the annular shoulder to the forward end of the cylinder being of a length to provide the required main piston movement for varying the opening of the exhaust nozzle within the first range of normal operation, the distance from the annular shoulder to the rear of the cylinder being of a length to provide the required main piston movement for moving the exhaust nozzle through the second range to the fully open condition of afterburner operation, a hydraulic system serving the actuator including means to selectively direct hydraulic fluid to the respective opposite ends of the cylinder, the main piston being substantially longer than the forward portion of the cylinder and being slidably received within the rear portion such that under normal operating conditions the head of the piston projects into the forward portion ahead of the annular shoulder, a locking piston slidably mounted within the head of the main piston for longitudinal movement relative thereto, locking means adapted to be moved radially outwardly from the sides of the head of the main piston upon forward movement of the locking piston relative to the main piston, the locking piston being exposed to hydraulic pressure in the forward portion of the cylinder to move the locking piston rearwardly relative to the main piston, and spring means normally urging said locking piston forward relative to the main piston, whereby in the event of a failure of hydraulic pressure within the system serving the actuator during normal operating conditions the locking means are moved radially outwardly in position to contact the annular shoulder and thereby prevent the main piston from moving to the rear of the cylinder.

References Cited in the file of this patent

UNITED STATES PATENTS

| 2,163,982 | Mercier | June 27, 1939 |
| 2,683,347 | Abdo | July 13, 1954 |
| 2,683,348 | Petry | July 13, 1954 |

FOREIGN PATENTS

| 573,033 | Great Britain | Nov. 2, 1945 |